No. 829,216. PATENTED AUG. 21, 1906.
A. A. JONES.
NUT LOCK.
APPLICATION FILED AUG. 9, 1904.
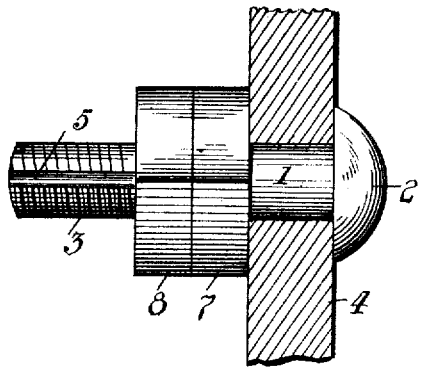
Fig. 1.
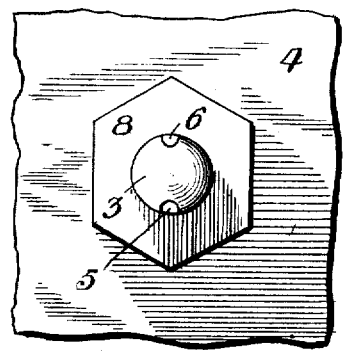
Fig. 2.
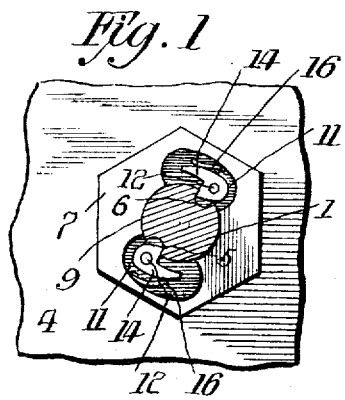
Fig. 3.
Fig. 4.
Fig. 5.
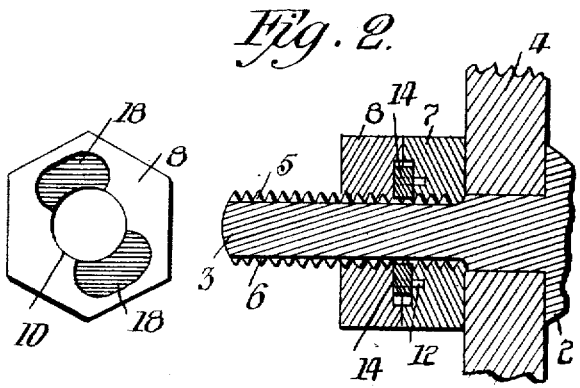
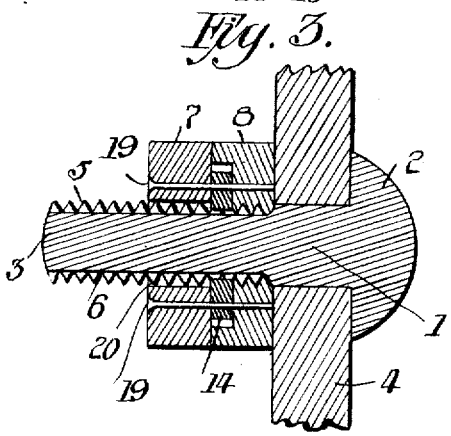
Fig. 6.
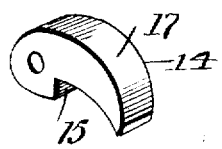
Fig. 7.
Witnesses:
K. H. Butler
C. Klostermann
Inventor
A. A. Jones,
By N. C. Ever & Co.
Attorneys

UNITED STATES PATENT OFFICE.

ALVEY A. JONES, OF TURTLE CREEK, PENNSYLVANIA.

NUT-LOCK.

No. 829,216.      Specification of Letters Patent.      Patented Aug. 21, 1906.

Application filed August 9, 1904. Serial No. 220,098.

*To all whom it may concern:*

Be it known that I, ALVEY A. JONES, a citizen of the United States of America, residing at Turtle Creek, in the county of Allegheny and State of Pennsylvania, have invented certain new and useful Improvements in Nut-Locks, of which the following is a specification, reference being had therein to the accompanying drawings.

This invention has relation to certain new and useful improvements in nut-locks; and the invention has for its object the provision of novel means whereby when a nut has been once placed upon a bolt or screw-threaded shank portion the same will be retained thereon until removed.

The invention has for another one of its objects the provision of means in connection with the nut whereby when the same has been placed upon a bolt it will engage said bolt and be prevented from becoming loose or disengaged from said bolt, and I employ a novel form of bolt to accomplish this result.

The invention contemplates the use of a bolt having one or more grooves formed therein, and in the nut I provide spring-pressed pawls which are adapted to engage within the grooves of the bolt and prevent the nut from rotating.

The above construction will be hereinafter more fully described in detail and then specifically pointed out in the claims, and, referring to the drawings accompanying this application, like numerals of reference designate corresponding parts throughout the several views, in which—

Figure 1 is a side elevation of my improved nut-lock, showing the same mounted upon a bolt. Fig. 2 is a front view of the same. Fig. 3 is a front view of one member of the nut, the other member being removed to show the spring-pressed locking-pawls. Fig. 4 is a front view of one of the members of the nut, showing the same disengaged from the member illustrated in Fig. 3 of the drawings. Fig. 5 is a longitudinal sectional view of my improved nut-lock. Fig. 6 is a longitudinal sectional view of a modified form of my improved nut-lock, and Fig. 7 is a detail perspective view of one of the locking-pawls.

To put my invention into practice, I employ the ordinary form of bolt 1, which carries a head 2 and has its shank portion screw-threaded, as indicated at 3. In Figs. 1 to 3, inclusive, I have illustrated the bolt as being secured in a pece of material 4. The bolt is provided longitudinally of its length with two grooves 5 and 6, these grooves being formed diametrically opposite each other. The locking mechanism of my improved nut-lock is constructed in the nut, which comprises two members 7 and 8. The nut, as illustrated in the accompanying drawings, is hexagon in form, although the same may be square or octagon in form, and each member of the nut is provided with an ordinary screw-threaded aperture 9 and 10, this aperture being of the same diameter as the bolt 1.

In the face of the member 7 I form two recesses 11 11, these recesses being diametrically opposite each other, and in each recess is mounted a pin 12 and a pawl 14, which is provided with a shoulder 15, that is adapted to engage in the grooves 5 and 6. Mounted in the recesses 11 11 are flat springs 16 16, which are adapted to bear against the rear face 17 of each pawl 14. The member 8 of the nut is provided with recesses 18 18, formed diametrically opposite each other, and these recesses when the member 8 is placed in engagement with the member 7 coincide with the recesses 11 11 of the member 7, as clearly illustrated in Fig. 5 of the drawings. The recesses 11 11 and 18 18 are adapted to surround the pawls 14 14, each pawl being supported between said recesses. The springs 16 16 are adapted to normally hold the shoulder 15 of each pawl in the grooves 5 and 6, as shown in Fig. 3 of the drawings, and the manner of securing the nut upon the bolt is as follows: The member 8 is placed in engagement with the member 7, these two members assuming the position shown in Fig. 5 of the drawings, at which time the nut in its entirety may be placed upon the bolt by rotating the same until it has engaged the material through which the bolt passes. At each rotation of the nut the pawls 14 14 will travel over the grooves 5 and 6, and the threads 3 of the bolt and the nut will be prevented from a rearward movement by the shoulder 15 of each pawl engaging in the grooves. It will be impossible for the member 8 to become disengaged from the member 7, owing to the fact that the member 8 is provided with a screw-threaded aperture, and when it has been once rotated in conjunction with the member 7 upon the bolt the locking-pawls 14 14, which partly protrude into the recesses 18 18 of the member 8, and the pawls prevent the member 8 from becoming disengaged from the bolt or the member 7.

In Fig. 6 of the drawings I have illustrated a modified form of constructing my improved nut-lock, and in this form the nut may be removed from the bolt at any time it may be desired to release the same from engagement with the bolt. In this form I employ a bolt constructed similar to the bolt of my preferable form previously described, and the members 7 and 8 are similarly constructed, with the exception that the member 8 is formed with a recess of a sufficient depth to receive the locking-pawls 14 14, and these locking-pawls are mounted in the member 8 by pins 19 19, which besides supporting the locking-pawls within their respective recesses secure the member 7 to the member 8, and the member 7 is provided with a smooth bore 20, as shown in Fig. 6 of the drawings. The nut of my modified form comprises, as heretofore stated, the members 7 and 8, and these members are held in engagement with each other by the pins 19 19, which pass through said members. To place the nut upon a bolt, the same is rotated the desired distance, at which time the pawls will engage in the grooves of the bolt, and should it be desired to remove the nut at any time from said bolt the pins 19 19 are withdrawn, whereby the member 7 may be removed from the bolt by sliding the same therefrom and the springs which bear against the pawls of the nut raised to permit the pawls to become disengaged from the grooves as the nut is reversely rotated to remove the same from the bolt.

It will be observed from the construction employed in connection with my improved nut-lock that the same may be readily used upon a screw-threaded shank or rod upon which it is desired to lock a nut, and I may employ any number of locking-pawls, the same depending on the size of the bolt and nut.

It will be noted that various changes may be made in the arrangement of the pawls, the size of the same, and other such changes as will be permissible by the appended claims.

What I claim, and desire to secure by Letters Patent, is—

1. In a nut-lock, the combination with a longitudinally-grooved bolt of a nut composed of two half-sections of equal size and of the same contour, connected so as to rotate together, one of said half-sections having recesses in its abutting face, and pivoted spring-pressed pawls mounted in such recesses and engaging the grooves in the bolt.

2. In a nut-lock, a longitudinally-grooved bolt, combined with a nut embodying two equal sections or members mounted on the bolt and rotatable in unison thereon, the inner of said members having oppositely-disposed recesses in its outer face, spring-pressed pawls mounted in the said recesses and provided with shoulders to take into the grooves of the bolt, and pins fastening the two sections or members of the nut together and passing through the pawls and serving as pivots for the same, substantially as described.

In testimony whereof I affix my signature in the presence of two witnesses.

ALVEY A. JONES.

Witnesses:
C. KLOSTERMANN,
K. H. BUTLER.